Figure 1:
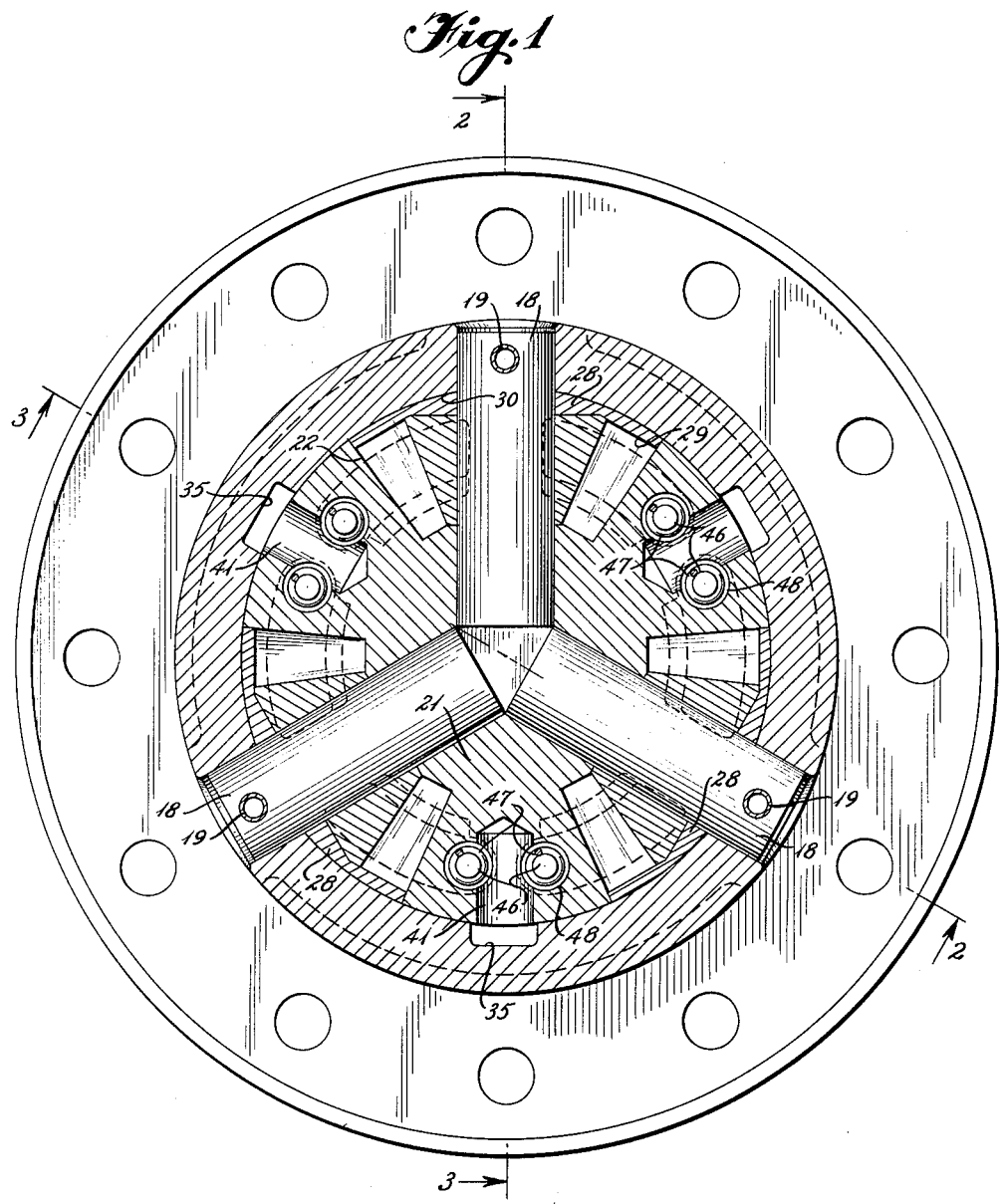

Feb. 1, 1966  C. H. NICKELL  3,232,139
HYDRAULICALLY OPERATED PARTIAL LOCK DIFFERENTIAL
Filed Feb. 2, 1962  4 Sheets-Sheet 1

INVENTOR
CLAUDE H. NICKELL

BY
ATTORNEY

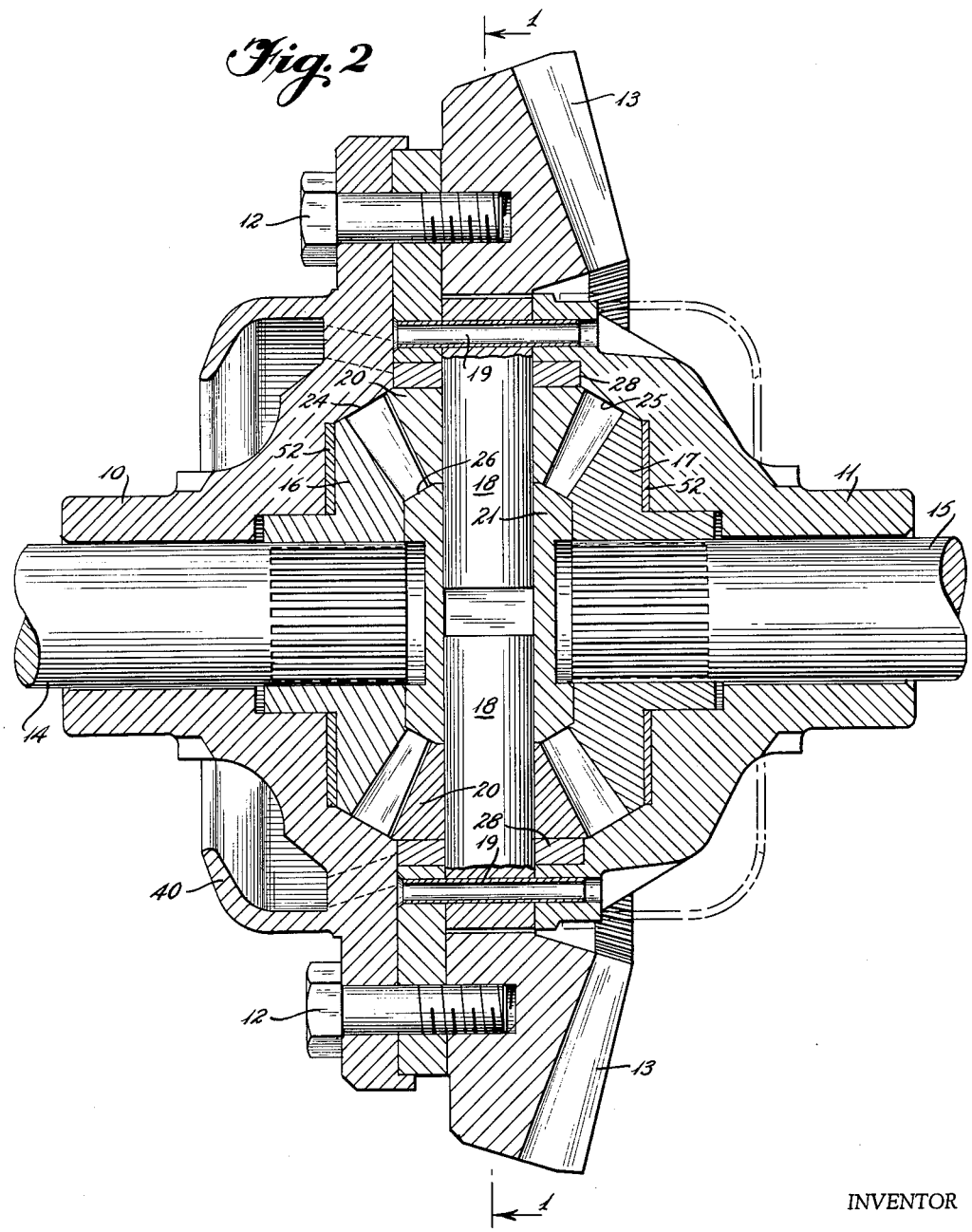

Feb. 1, 1966 C. H. NICKELL 3,232,139
HYDRAULICALLY OPERATED PARTIAL LOCK DIFFERENTIAL
Filed Feb. 2, 1962 4 Sheets-Sheet 3
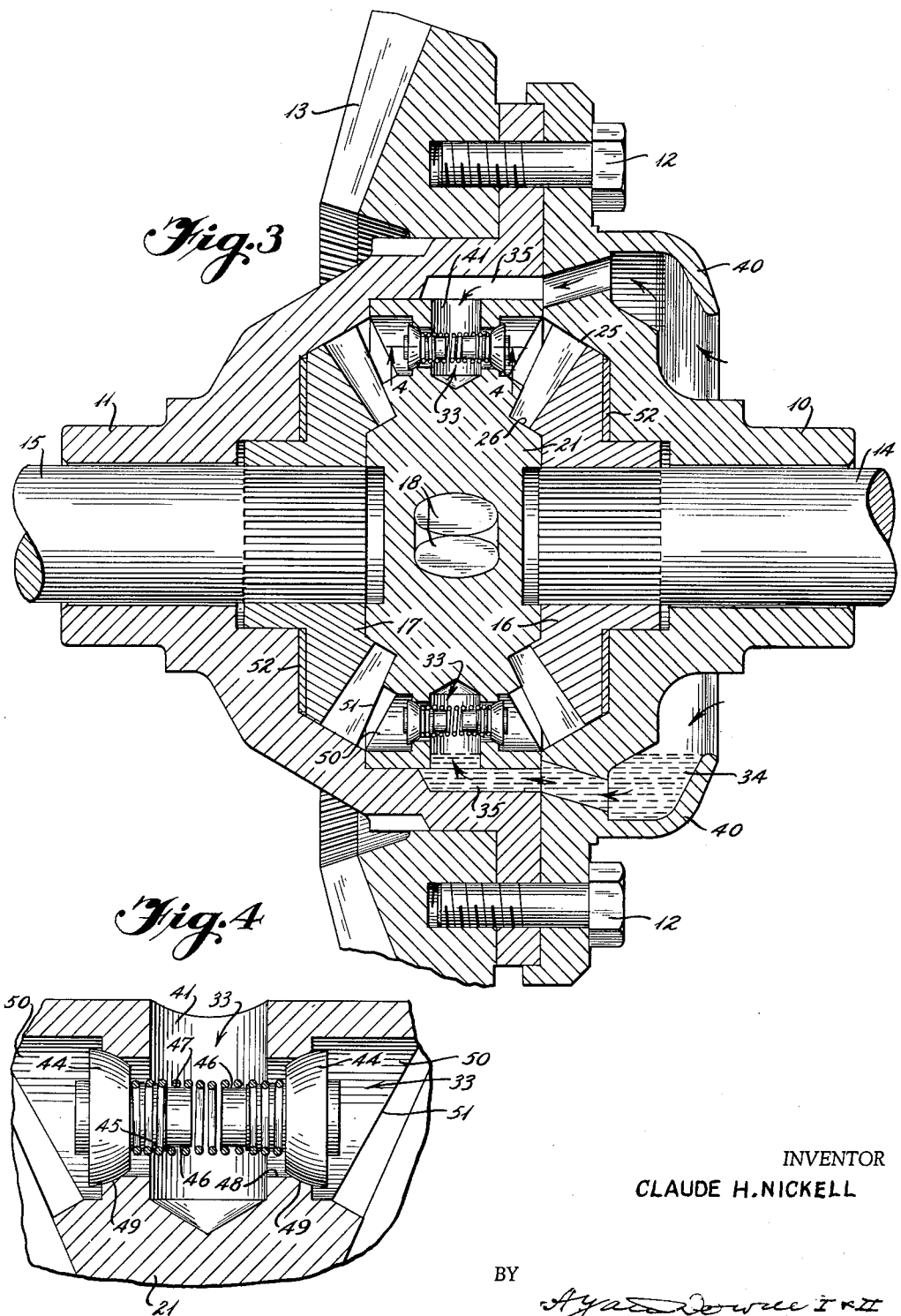
INVENTOR
CLAUDE H. NICKELL
BY
ATTORNEY Feb. 1, 1966 C. H. NICKELL 3,232,139
HYDRAULICALLY OPERATED PARTIAL LOCK DIFFERENTIAL
Filed Feb. 2, 1962 4 Sheets-Sheet 4

INVENTOR
CLAUDE H. NICKELL

BY
ATTORNEY

United States Patent Office 3,232,139
Patented Feb. 1, 1966

3,232,139
HYDRAULICALLY OPERATED PARTIAL
LOCK DIFFERENTIAL
Claude H. Nickell, 17809 Oakwood Blvd.,
Dearborn, Mich.
Filed Feb. 2, 1962, Ser. No. 170,741
5 Claims. (Cl. 74—711)

This invention relates to devices employed in the transmission of power from a driving member to two or more driven members, and automatic means for selectively transferring such power to such driven members when required.

The invention relates particularly to a differential for a vehicle having a source of motive power for transmitting torque to two or more output shafts and driven members, and to automatic means for transferring such torque to selected driven members when other driven members lose traction and provide no driving force.

Heretofore various mechanisms have been produced for transmitting driving torque from a driving source to a plurality of driven members including manually controlled external oil pumps, clutch means, manual control means, and the like. However these prior devices were manually controlled, complicated, bulky unreliable, and otherwise unsatisfactory.

It is an object of the invention to provide hydraulically proportioned output differential mechanisms capable of automatically transferring torque from a driving member to one or more driven members when other driven members begin to slip or lose traction.

Another object of the invention is to provide hydraulically proportioned output differential mechanism having a plurality of automatic directional flow control valve assemblies capable of introducing hydraulic fluid into the area of the cooperating engaging teeth of the differential to provide a partial hydraulic lock to prevent free rotation of a driven member which has begun to slip or lose traction.

A further object of the invention is to provide an hydraulically proportioned output differential of simple construction, which will be relatively easy to maintain, and which will automatically transfer driving torque to a selected driven member or members.

A still further object of the invention is to provide a relatively simple hydraulically proportioned output differential adapted to transfer driving torque to selected driven members, and automatically to proportion the amount of torque thus transmitted depending upon the amount of slippage of others of such driven members.

Other objects and advantages of the invention will be apparent from the following description taken in conjunction with the accompanying drawings wherein:

FIG. 1 is a vertical section through the differential of the present invention substantially along the line 1—1 of FIG. 2;

FIG. 2, a section on the line 2—2 of FIG. 1;

FIG. 3, a section on the line 3—3 of FIG. 1;

FIG. 4, an enlarged fragmentary detail section on the line 4—4 of FIG. 3; and

Figure 5:
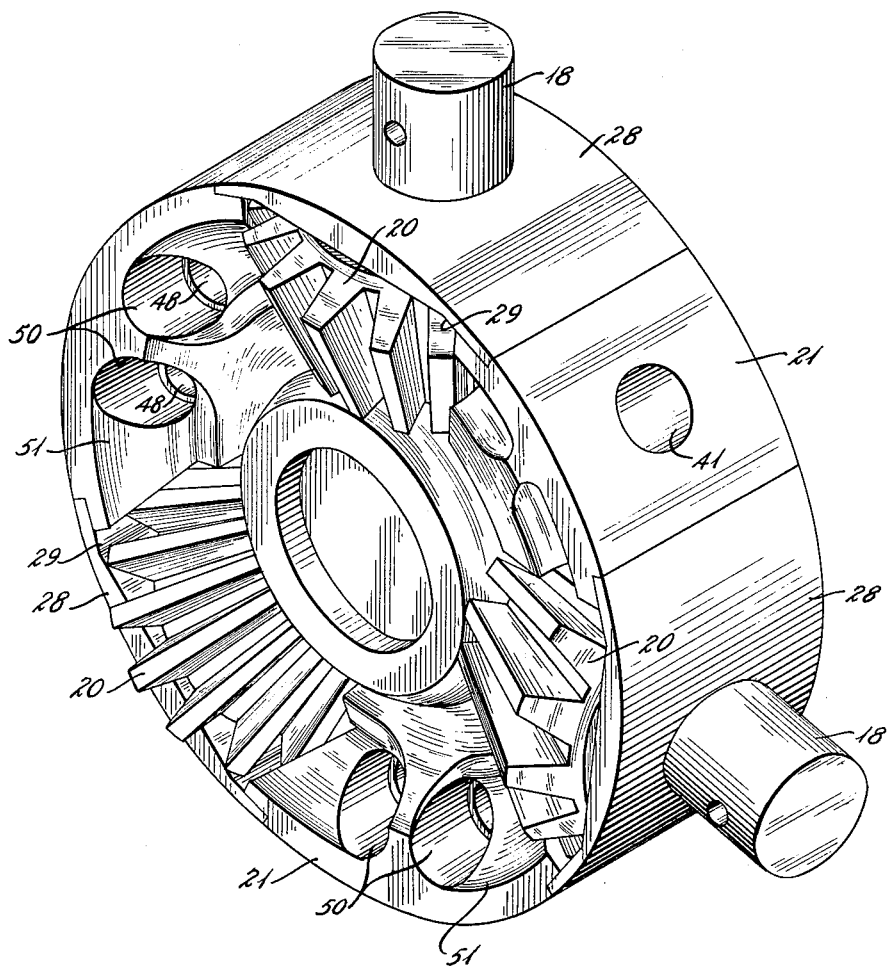

FIG. 5, a perspective of the inner shroud illustrating the cooperation between the compensating gears and the valve assemblies.

Briefly stated, the present invention is an output differential having side and compensating gears removably attached to output shafts, and such differential is provided with a source of hydraulic fluid and a plurality of automatic directional flow control valve assemblies which automatically become operable when the driven member on one of the output shafts begins to slip or lose traction, and the accelerated rotation of such driven member causes the opening of a valve and the introduction of hydraulic fluid into the area of the engaging teeth of the side and compensating gears to create a partial fluid lock to resist the free rotation of the slipping driven member and to transmit a greater proportion of driving torque to the non-slipping driven member.

With continued reference to the drawing, the hydraulically proportioned output differential of the present invention comprises left and right hand interfitting differential casings 10 and 11 connected by a plurality of fasteners 12 to a driving member 13 such as a spur gear, pulley, sprocket, ring gear, bevel gear or the like. The casings 10 and 11 are supported on hubs 10' and 11' respectively by conventional bearings and a differential housing, not shown, and a pair of opposed axles or output shafts 14 and 15 are freely rotatable within such casings. The inner or free ends of the shafts 14 and 15 are splined or otherwise removably attached to bevel side gears 16 and 17 respectively.

In order to provide a mechanical gear train drive for a differential action, one or more pins 18 are removably attached to one of the differential casings by fasteners 19 and such pins form an axis of rotation for multiple compensating or bevel pinion gears 20, the teeth of which gears mesh with the teeth of the side gears 16 and 17. Any desired number of compensating gears may be used as long as they are equally spaced and balanced around the periphery of such side gears.

The pins 18 connect one of the differential casings to a central oil trapping member or shroud 21, and the compensating gears 20 are received within recesses or pockets 22 in such shroud in a manner that the teeth of the compensating gears are in close proximity to the recesses 22 for a purpose which will be later explained.

As illustrated in FIGS. 1–3 the shroud 21 and the differential casings 10 and 11 are in close proximity to the intermeshing teeth of the side gears 16 and 17 and the compensating gears 20. In order to provide a substantially oil tight connection, differential casings 10 and 11 are provided with angular surfaces 24 and 25 respectively, and the shroud 21 is provided with an angular surface 26 with such angular surfaces being substantially normal to the pitch angle of the interengaging teeth.

A combination thrust plate and sealing member 28 is located in operative association with the outer surface of each compensating gear, and such plates are adapted to maintain the compensating gears 20 in correct engagement with the side gears 16 and 17 when the differential is rotated and the mechanical separating force tends to disengage the compensating gears and side gears. The plate 28 is of a width generally corresponding to the width of the shroud 21 and of a length to act as a sealing member for sealing against the passage of oil around the side faces of the teeth in the plane of the shroud 21. Such shroud is provided with a recess 29 to accommodate the generally arcuate rectangular thrust plate 28 and the arcuate upper surface of such plate is provided with a radius substantially corresponding to the internal radius 30 of the cooperating differential case.

During the normal operation of the axles or output shafts 14 and 15, the side gears 16 and 17 and the compensating gears 20 provide a mechanical gear train drive with a conventional differential action. The thrust plates 28 are constructed of a frictional material such as sintered bronze to resist free rotation of the compensating gears and simultaneously to eliminate wear on both the gear and the plate. A conventional driven member such as a wheel or the like (not shown) is attached to the outer end of each of the axles or output shafts 14 and 15 and when one of such driven members encounters a surface in which the member is not under full traction, such member will slip and will normally tend to increase its revoluations per minute. Since there is no reaction to such driven member, most of the torque is transmitted thereto with insufficient torque transmitted to the nonslipping member to propel the vehicle to which the differential is attached.

In order to prevent the transmission of torque to the slipping driven member the present invention contemplates the introduction of hydraulic or other fluid under suction into the gear train drive through a series of automatic directional flow control valve assemblies 33. A pair of such valve assemblies 33 are located in operative association with each compensating gear and such assemblies are provided with fluid 34 through ports 35 located in the differential cases 10 and 11. When the driven member on the end of the output shaft begins to slip, the major portion of the torque will be transmitted to such shaft and the side gear will increase its revolutions per minute and create a suction on the valve assemblies. Such suction will open one side of the valve assemblies 33 and permit hydraulic fluid to be introduced into the area of the intermeshing gear teeth. Since no discharge passageways are provided, the fluid cannot readily escape and thus forms a partial oil lock to prevent free rotation of the slipping driven member and to transmit substantially the full input troque to the nonslipping driven member.

The hydraulic fluid is contained in the lower portion of a conventional differential housing (not shown) and the lower portion of the driving member 13 is normally immersed in such hydrulic fluid. When the driving member 13 is rotated, the hydraulic fluid will adhere to such driving member and as the latter is rotated rapidly, centrifugal force will throw the hydraulic fluid outwardly against the differential housing and onto a conventional rib or trough from which the fluid will drain from such rib into a radial opening or well 40 in the casting of the differential casting 10. The well 40 maintains a supply of fluid in its lowermost portion and when the differetial casings are rotated the entire well will be filled due to centrifugal force. The plurality of ports 35 connect the well 40 with a series of inlet openings 41 in the shroud 21 so that oil can flow from the well through the ports and into the inlet openings to provide a supply of fluid to the automatic directional flow control valve assemblies. Fluid can flow in either direction depending upon which driven member is slipping and the direction of the vehicle, to which the device is attached. The amount of fluid which passes through the valve assemblies is variable in accordance with the amount of slippage of the driven member and the consequent amount of suction created thereby.

Each valve assembly comprises a pair of valves 44 having a threaded shoulder 45 and a reduced inner extremity or stern 46. The threaded shoulders 45 receive the opposed ends of a tension spring 47 designed to urge the valves 44 toward each other under a predetermined stressed load. Such valves 44 are retained substantially within an opening 48 in the shroud 21 and bear against a valve seat 49 on opposite sides thereof. In order to provide clearance and to space the valves from the intermeshing teeth of the cooperating side and compensating gears to permit the valves to open, the shroud is provided with a counterbore or recess 50 on each side thereof in communication with an annular channel or port 51 connecting the valve assembly 33 with the opposite sides of the compensating gears 20.

Due to the natural mechanical separating force and the pressure of the partial fluid lock created by the introduction of hydraulic fluid against the intermeshing gears, the compensating gears and side gears tend to move apart and become disengaged. The thrust plate 28 prevents outward movement of the compensating gears 20 and in order to take advantage of the tendency of the side gears to move axially of the shafts, a frictional washer or plate 52 is located between the rear of the side gears 16 and 17 and the differential cases 10 and 11. Such plate is constructed of sintered bronze or the like to prevent the free rotation of the side gears as well as to provide a bearing surface to substantially eliminate wear on both the side gears and the differential casings. It will be apparent that the greater the force applied and the more tendency for the gears to separate, the greater will be the frictional coefficient between the side gears 16 and 17 and the plate 52 as well as between the compensating gears 20 and the thrust plates 28.

In the normal operation of the device, the mechanical gear train drive will function as a conventional differential, however, when one of the driven members begins to lose traction, the shaft of such driven member will increase the revolutions per minute of the side gear connected thereto to create a suction which automatically overcomes the tension of the spring 47 and opens the valve 44 to introduce hydraulic fluid into an area adjacent the intermeshing teeth of the side gear and compensating gears. Such hydraulic fluid creates a partial lock to halt the free rotation of such gears and to transmit torque to the opposite shaft and driven member. The introduction of fluid plus the natural mechanical separating force will cause the side gears and compensating gears to tend to separate and in so doing the side gears will apply greater pressure to the frictional bearings members 52 and the compensating gears will apply greater pressure to the thrust plates 28 to further resist the free rotation of the gears.

If desired, an additional well may be provided on the differential casing 11 illustrated in phantom in FIG. 2 to provide fluid to the automatic directional flow control valve assemblies from both sides of the differential casings.

It will be apparent that the rotating side gears will function as fluid pumps to assist the flow of fluid into the area of the intermeshing teeth and that a pair of valve assemblies 33 are associated with each compensating gear so that a partial oil lock will be formed regardless of which driven member is slipping or which direction the vehicle is moving.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An hydraulically proportioned output differential having
   (A) a pair of interfitting casing members,
   (B) a driving member,
   (C) fastening means connecting said driving member and said pair of casing members,
   (D) a pair of output shafts rotatably supporting said differential,
   (E) a side gear removably attached to each of said output shafts,
   (F) a shroud mounted centrally of said casing members intermediate said side gears,
      (1) a plurality of pins carried by said shroud,
      (2) multiple compensating gears rotatably carried by said pins and adapted to mesh with said side gears to form a mechanical gear train drive,
   (G) means for introducing hydraulic fluid into the areas of engagement of said gear train drive including
      (1) a series of automatic directional flow control valve assemblies in said shroud having
         (a) a pair of opposed valve members,
         (b) spring means for urging said valve members towards each other,
      (2) an annular channel providing communication between said valve members and the areas of gear engagement, whereby when one of said side gears becomes freely rotatable due to the sliping of its driven member, selected valve assemblies will open to introduce hydraulic fluid into the area of engagement of said side and compensating gears to create a partial lock to resist the free rotation of said gears and to transmit driving torque to the driven member which is not slipping.

2. An hydraulically proportioned output differential having
(A) a driving member mounted on a pair of casing members,
(B) a pair of output shafts rotatably supporting said differential,
(C) a side gear removably attached to each of said output shafts,
(D) a shroud carried by said casing members intermediate said side gears,
   (1) at least one pin carried by said shroud,
   (2) multiple compensating gears rotatably carried by said shroud and adapted to mesh with said side gears to form a mechanical gear train drive,
(E) means for introducing hydraulic fluid into the areas of engagement of said gear train drive including
   (1) a series of automatic directional flow control valve assemblies having
      (a) a pair of opposed valve members,
      (b) spring means for urging said valve members towards each other,
   (2) an annular channel providing communication between a pair of said valve assemblies and each area of gear engagement,
whereby when one of said side gears becomes freely rotatable due to the slipping of its driven member, selected valve assemblies will open to introduce hydraulic fluid through a portion of said annular channel into the area of engagement of said side and compensating gears to create a partial lock to resist the free rotation of said gears and to transmit driving torque to the driven member which is not slipping.

3. The structure of claim 2 including
(A) a thrust plate in operative association with the outer surface of each compensating gear and
(B) a frictional washer intermediate said side gears and said differential
whereby said thrust plate and said frictional washer will resist the free rotation of said compensating and side gears.

4. Apparatus for the transmitting of driving torque comprising
(A) a pair of output shafts,
(B) a differential casing rotatably supported by said output shafts and including
(C) a side gear removably attached to each of said output shafts,
(D) a series of compensating gears meshing with said side gears and forming a mechanical gear train drive,
(E) a shroud rotatably suporting said compensating gears,
(F) means for introducing hydraulic fluid into the areas of engagement of said gear train drive including
   (1) a source of hydraulic fluid,
   (2) a series of automatic directional flow control valve assemblies carried by said shroud,
   (3) a plurality of ports communicating said source of hydraulic fluid and said valve assemblies,
   (4) an annular channel providing communication between a pair of valve assemblies and each area of engagement of said gear train drive,
whereby when selected valve assemblies are opened automatically, hydraulic fluid will flow through said annular channels and be introduced into the area of the meshing teeth of the side and compensating gears to create a partial lock to prevent the free rotation of one of said side gears and thereby transmit torque to the other side gear.

5. In a differential having a casing and a pair of output shafts with a side gear mounted on each shaft and a plurality of compensating gears meshing with said side gears in predetermined areas, a central shroud mounted within said casing, said shroud having multiple recesses for the reception of said compensating gears, said compensating gears being mounted on pins carried by said shroud, means automatically for introducing fluid into said predetermined areas of gear engagement when one of said side gears rotates more rapidly than the other side gear, said means including a series of directional flow control valve assemblies carried by said shroud, an annular channel providing communication between multiple valve assemblies and each predetermined area of gear engagement, whereby when one of said side gears rotates more rapidly than the other, certain valve assemblies will open automatically to permit fluid to flow therethrough and through said cooperating annular channels into predetermined areas of gear engagement to create a partial lock to resist the free rotation of said gears and to transmit driving torque to the member which is not rotating as rapidly.

References Cited by the Examiner
UNITED STATES PATENTS

| | | | |
|---|---|---|---|
| 1,529,942 | 3/1925 | Bradley | 74—711 |
| 2,930,256 | 3/1960 | Wildhaber | 74—711 |
| 2,997,897 | 8/1961 | Brownyer | 74—711 |
| 3,049,943 | 8/1962 | Frentzel | 74—711 |

DON A. WAITE, *Primary Examiner.*
BROUGHTON G. DURHAM, *Examiner.*